(12) United States Patent
Hamlin et al.

(10) Patent No.: US 11,979,397 B2
(45) Date of Patent: May 7, 2024

(54) PLATFORM FRAMEWORK AUTHENTICATION

(71) Applicant: Dell Products, L.P., Round Rock, TX (US)

(72) Inventors: Daniel L. Hamlin, Round Rock, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 443 days.

(21) Appl. No.: 17/355,232

(22) Filed: Jun. 23, 2021

(65) Prior Publication Data
US 2022/0417239 A1    Dec. 29, 2022

(51) Int. Cl.
*H04L 9/40* (2022.01)
(52) U.S. Cl.
CPC ................ *H04L 63/0853* (2013.01)
(58) Field of Classification Search
CPC ............... H04L 63/0853; H04L 63/107; H04L 63/0815; H04L 63/0823
See application file for complete search history.

(56) References Cited

U.S. PATENT DOCUMENTS

| | | | |
|---|---|---|---|
| 8,176,189 B2* | 5/2012 | Traversat | H04L 9/40 709/225 |
| 8,321,921 B1* | 11/2012 | Ahmed | G06F 21/602 726/5 |
| 11,057,375 B1* | 7/2021 | Conley | H04L 63/0853 |
| 2005/0086300 A1* | 4/2005 | Yeager | H04L 69/329 709/204 |
| 2012/0266229 A1* | 10/2012 | Simone | G06F 21/41 726/5 |
| 2016/0234216 A1* | 8/2016 | Fausak | H04L 67/1001 |
| 2017/0070536 A1* | 3/2017 | Mortman | H04L 41/00 |
| 2022/0038282 A1* | 2/2022 | Teramoto | H04L 9/0894 |

OTHER PUBLICATIONS

Miguel Castro, et al. 2002. One ring to rule them all: service discovery and binding in structured peer-to-peer overlay networks. In Proceedings of the 10th workshop on ACM SIGOPS European workshop (EW 10). Association for Computing Machinery, New York, NY, USA, (Year: 2002).*

* cited by examiner

*Primary Examiner* — Michael R Vaughan
(74) *Attorney, Agent, or Firm* — Fogarty LLP

(57) ABSTRACT

Embodiments of systems and methods for platform framework authentication are described. In some embodiments, an Information Handling System (IHS) may include a processor and a memory coupled to the processor, the memory having program instructions stored thereon that, upon execution, cause the IHS to: receive, via an authentication provider registered with a platform framework via an Application Programming Interface (API), an authentication credential; and send the authentication credential to a plurality of applications registered with the platform framework.

18 Claims, 4 Drawing Sheets

PLATFORM FRAMEWORK AUTHENTICATION

FIELD

The present disclosure relates generally to Information Handling Systems (IHSs), and more particularly, to systems and methods for platform framework authentication.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of systems and methods for platform framework authentication are described. In an illustrative, non-limiting embodiment, an Information Handling System (IHS) may include a processor and a memory coupled to the processor, the memory having program instructions stored thereon that, upon execution, cause the IHS to: receive, via an authentication provider registered with a platform framework via an Application Programming Interface (API), an authentication credential; and send the authentication credential to a plurality of applications registered with the platform framework.

The authentication credential may include a password, biometric information, a certificate, or cryptographic material. The authentication credential may be received from an Operating System (OS) login service. Additionally, or alternatively, the authentication credential may be received from an application other than the plurality of applications.

The authentication credential may enable the other application to communicate with any of the plurality of applications securely and outside of the platform framework. Additionally, or alternatively, the authentication credential may be sent to at least one of the plurality of application in response to context information matching a policy. The context information may include at least one of: a location of the IHS, a user's proximity to the IHS, an IHS posture, a power state of the IHS, or a battery charge level of the IHS.

In some cases, the platform framework may be at least in part executed within a workspace, and the policy may be identified in a workspace definition associated with the workspace. The program instructions, upon execution, may cause the IHS to send the authentication credential to each given application of the plurality of applications in response to the given application's registration with the platform framework. The program instructions, upon execution, may also cause the IHS to advertise, via the authentication provider to the plurality of applications, an availability of the authentication credential. The authentication credential may be sent in response to individual requests from each of the plurality of applications. The advertisement may identify a method of authentication.

In another illustrative, non-limiting embodiment, a memory storage device may have program instructions stored thereon that, upon execution by an IHS, cause the IHS to: enable an application to register with a platform framework; and enable the application to send an authentication credential to an authentication provider within the platform framework, where the authentication provider is configured to provide the authentication credential to another application registered with the platform framework.

In yet another illustrative, non-limiting embodiment, a method may include registering with a platform framework; and receiving an authentication credential from an authentication provider within the platform framework, where the authentication provider is configured to get the authentication credential from an application registered with the platform framework.

The authentication credential may include a password, biometric information, a certificate, or cryptographic material. The application may include an OS login service. The authentication credential may be received from the authentication provider in response to context information matching a policy, and the context information may include at least one of: a location of the IHS, a user's proximity to the IHS, an IHS posture, a power state of the IHS, or a battery charge level of the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

In this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
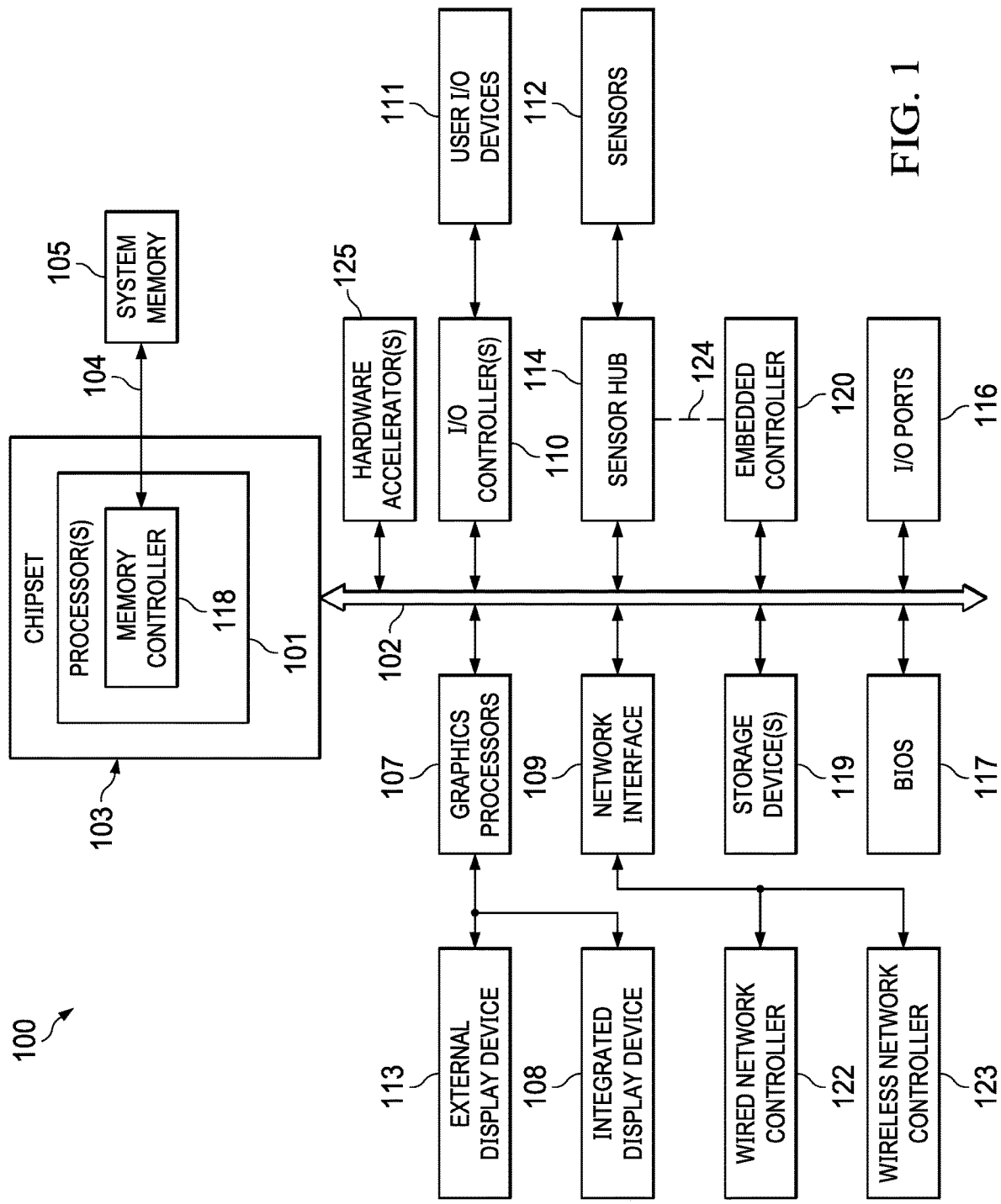
FIG. 1 is a block diagram of an example of hardware components of an Information Handling System (IHS) configured according to some embodiments.

FIG. 1 is a block diagram illustrating components of IHS 100 configured according to some embodiments. As shown, IHS 100 includes one or more processor(s) 101, such as a Central Processing Unit (CPU), that execute code retrieved from system memory 105.

Although IHS 100 is illustrated with a single processor, other embodiments may include two or more processors, that may each be configured identically, or to provide specialized processing operations. Processor(s) 101 may include any processor capable of executing instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor(s) 101 includes integrated memory controller 118 that may be implemented directly within its circuitry. Alternatively, memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 is coupled to processor(s) 101 and provides processor(s) 101 with a high-speed memory that may be used in the execution of computer program instructions. For example, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile, and volatile memor(ies). In certain embodiments, system memory 105 may include multiple removable memory modules.

IHS 100 utilizes chipset 103 that may include one or more integrated circuits coupled to processor(s) 101. In this embodiment, processor(s) 101 is depicted as a component of chipset 103. In other embodiments, all of chipset 103, or portions of chipset 103 may be implemented directly within the integrated circuitry of processor(s) 101. Chipset 103 provides processor(s) 101 with access to a variety of resources accessible via bus 102.

In IHS 100, bus 102 is illustrated as a single element. However, other embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to, or instead of USB ports, I/O ports 116 may include various types of physical I/O ports that are accessible to a user via an enclosure or chassis of IHS 100.

In certain embodiments, chipset 103 may additionally utilize one or more I/O controllers 110 that may each support the operation of hardware components such as user I/O devices 111. User I/O devices 111 may include peripheral components that are physically coupled to I/O port 116 and/or peripheral components wirelessly coupled to IHS 100 via network interface 109.

In various implementations, I/O controller 110 may support the operation of one or more user I/O devices 110 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to processor(s) 101 of IHS 100 through chipset 103. For instance, chipset 103 may be coupled to network interface 109 to enable different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE).

Network interface 109 may support network connections by wired network controller(s) 122 and wireless network controller(s) 123. Each network controller 122 and 123 may be coupled via various buses to chipset 103 to support different types of network connectivity, such as the network connectivity utilized by IHS 100.

Chipset 103 may also provide access to one or more display device(s) 108 and/or 113 via graphics processor(s) 107. Graphics processor(s) 107 may be included within a video card, graphics card, and/or an embedded controller installed within IHS 100. Additionally, or alternatively, graphics processor(s) 107 may be integrated within processor(s) 101, such as a component of a system-on-chip (SoC). Graphics processor(s) 107 may generate display information and provide the generated information to display device(s) 108 and/or 113.

One or more display devices 108 and/or 113 are coupled to IHS 100 and may utilize LCD, LED, OLED, or other display technologies (e.g., flexible displays, etc.). Each display device 108 and 113 may be capable of receiving touch inputs such as via a touch controller that may be an embedded component of the display device 108 and/or 113 or graphics processor(s) 107, for example, or may be a separate component of IHS 100 accessed via bus 102. In some cases, power to graphics processor(s) 107, integrated display device 108 and/or external display 133 may be turned off or configured to operate at minimal power levels in response to IHS 100 entering a low-power state (e.g., standby).

As illustrated, IHS 100 may support integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to external I/O port 116 of the IHS 100, via wireless docking station, etc. In certain scenarios, the operation of integrated displays 108 and external displays 113 may be configured for a particular user. For instance, a particular user may prefer specific brightness settings that may vary the display brightness based on time of day and ambient lighting conditions.

Chipset 103 also provides processor(s) 101 with access to one or more storage devices 119. In various embodiments, storage device 119 may be integral to IHS 100 or may be external to IHS 100. Moreover, storage device 119 may be accessed via a storage controller that may be an integrated component of the storage device.

Generally, storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. Under execution, BIOS 117 instructions may facilitate the loading of an operating system (OS) (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 100 embodiments may utilize sensor hub 114 (e.g., INTEL Sensor Hub or "ISH," etc.) capable of sampling and/or collecting data from a variety of hardware sensors 112. For instance, sensors 112, may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, location, angle (e.g., hinge angle), deformation, bending (e.g., of a flexible display), orientation, movement, velocity, rotation, acceleration, bag state (in or out of a bag), and/or lid sensor(s) (open or closed).

In some cases, one or more sensors 112 may be part of a keyboard or other input device. Processor(s) 101 may be configured to process information received from sensors 112 through sensor hub 114, and to perform methods for prioritizing the pre-loading of applications with a constrained memory budget using contextual information obtained from sensors 112.

For instance, during operation of IHS 100, the user may open, close, flip, swivel, or rotate display 108 to produce different IHS postures. In some cases, processor(s) 101 may be configured to determine a current posture of IHS 100 using sensors 112 (e.g., a lid sensor, a hinge sensor, etc.). For example, in a dual-display IHS implementation, when a first display 108 (in a first IHS portion) is folded against a second display 108 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait).

For instance, in a laptop posture, a first display surface of a display 108 may be facing the user at an obtuse angle with respect to a second display surface of a display 108 or a physical keyboard portion. In a tablet posture, a first display surface may be at a straight angle with respect to a second display surface or a physical keyboard portion. And, in a book posture, a first display surface may have its back (e.g., chassis) resting against the back of a second display surface or a physical keyboard portion.

It should be noted that the aforementioned postures and their various respective keyboard states are described for sake of illustration only. In different embodiments, other postures may be used, for example, depending upon the type of hinge coupling the displays, the number of displays used, or other accessories.

In other cases, processor(s) 101 may process user presence data received by sensors 112 and may determine, for example, whether an IHS's end-user is present or absent. Moreover, in situations where the end-user is present before IHS 100, processor(s) 101 may further determine a distance of the end-user from IHS 100 continuously or at predetermined time intervals. The detected or calculated distances may be used by processor(s) 101 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 108.

More generally, in various implementations, processor(s) 101 may receive and/or produce context information using sensors 112 via sensor hub 114, including one or more of, for example: a user's presence or proximity state (e.g., present, near-field, mid-field, far-field, and/or absent using a Time-of-Flight or "ToF" sensor, visual image sensor, infrared sensor, and/or other suitable sensor 112), a facial expression of the user (e.g., usable for mood or intent classification), a direction and focus of the user's gaze, a user's hand gesture, a user's voice, an IHS location (e.g., based on the location of a wireless access point or Global Positioning System, etc.), IHS movement (e.g., from an accelerometer or gyroscopic sensor), lid state (e.g., of a laptop or other hinged form factor), hinge angle (e.g., in degrees), IHS posture (e.g., laptop, tablet, book, tent, display, etc.), whether the IHS is coupled to a dock or docking station (e.g., wired or wireless), a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., by determine whether or not the user is holding a stylus, or the like), a time of day, software application(s) under execution in focus for receiving keyboard input, whether IHS 100 is inside or outside of a carrying bag or case, a level of ambient lighting, a battery charge level, whether IHS 100 is operating from battery power or is plugged into an AC power source (e.g., whether the IHS is operating in AC-only mode, DC-only mode, or AC+DC mode), a power mode or rate of power consumption of various components of IHS 100 (e.g., CPU 101, GPU 107, system memory 105, etc.).

In certain embodiments, sensor hub 114 may be an independent microcontroller or other logic unit that is coupled to the motherboard of IHS 100. Sensor hub 114 may be a component of an integrated system-on-chip incorporated into processor(s) 101, and it may communicate with chipset 103 via a bus connection such as an Inter-Integrated Circuit (I²C) bus or other suitable type of bus connection. Sensor hub 114 may also utilize an I²C bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main/host processor(s) 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions. In some embodiments, EC 120 and sensor hub 114 may communicate via an out-of-band signaling pathway or bus 124.

In various embodiments, chipset 103 may provide processor 101 with access to hardware accelerator(s) 125. Examples of hardware accelerator(s) 125 may include, but are not limited to, INTEL's Gaussian Neural Accelerator (GNA), Audio and Contextual Engine (ACE), Vision Processing Unit (VPU), etc. In some cases, hardware accelerator(s) 125 may be used to perform ML and/or AI operations offloaded by processor 101. For instance, hardware accelerator(s) 125 may load several audio signatures and/or settings, and it may identify an audio source by comparing an audio input to one or more audio signatures until it finds a match.

In some cases, however, hardware accelerator(s) 125 may have significant model concurrency and/or processing latency constraints relative to processor(s) 101. Accordingly, in some cases, context information may be used to select a subset and/or size of data signatures (e.g., audio), also number and/or complexity of models, number of concurrent models (e.g., only two or three models can be processed at a time), and/or latency characteristics (e.g., with 4 signatures or more, detection latency becomes unacceptable) of hardware accelerator(s) 125.

In various embodiments, IHS 100 may not include each of the components shown in FIG. 1. Moreover, IHS 100 may include various other components in addition to those that are shown in FIG. 1. Some components that are represented as separate components in FIG. 1 may be integrated with other components. For example, in some implementations, all or a portion of the features provided by the illustrated components may instead be provided by an SoC.

In a conventional IHS, each application would have to know how to communicate with each specific hardware endpoint 101-124 it needs, which can place a heavy burden on software developers. Moreover, in many situations, multiple applications may request the same information from the same hardware endpoint, thus resulting in inefficiencies due to parallel and/or overlapping code and execution paths used by these applications to perform get and set methods with that same endpoint.

To address these, and other concerns, a platform framework as described herein may enable an overall, comprehensive system management orchestration of IHS 100. Particularly, such a platform framework may provide, among other features, the scalability of multiple applications requesting direct hardware endpoint (e.g., 101-124) access. Additionally, or alternatively, a platform framework as described herein may provide performance optimizations and increased operational stability to various IHS environments.

Figure 2:
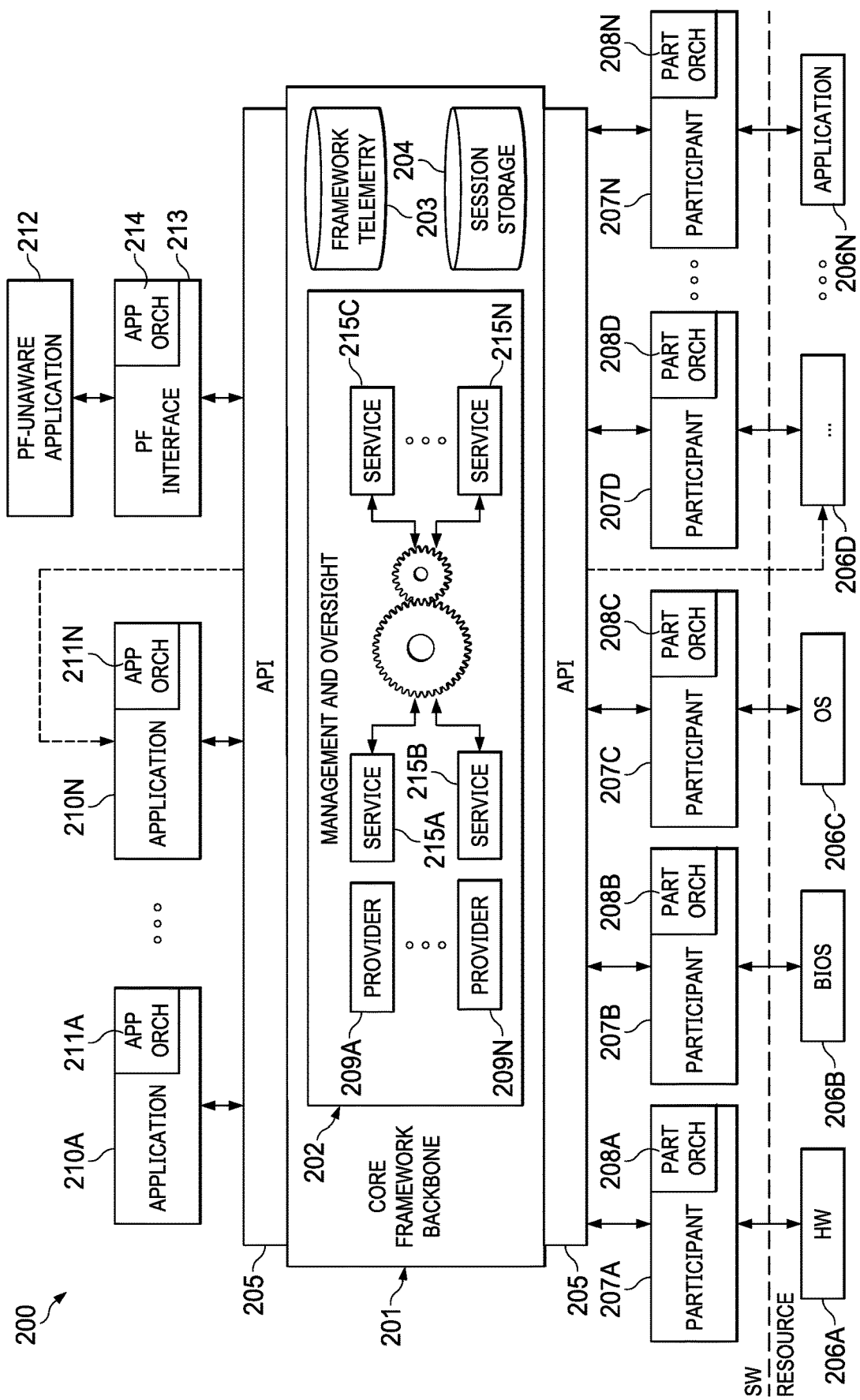
FIG. 2 is a block diagram illustrating an example of a platform framework deployed in an IHS, according to some embodiments.

FIG. 2 is a block diagram illustrating an example of platform framework 200. In some embodiments, IHS 100 may instantiate each element of platform framework 200 through the execution of program instructions, stored in a memory (e.g., system memory 105, storage device(s) 119, etc.), by one or more processors or controllers (e.g., processor(s) 101, GPU 107, hardware accelerators, etc.).

In some implementations, platform framework 200 may be supported by and/or executed within an OS used by IHS 100, and it may be scaled across user and kernel spaces. Additionally, or alternatively, platform framework 200 may be provided as a software library or an ".exe" file.

As shown, platform framework 200 includes core framework backbone 201 and Application Programming Interface (API) 205. Core framework backbone 201 includes management and oversight engine 202 (with services 215A-N), framework telemetry database 203, and session storage database 204.

In operation, platform framework 200 enables the management and orchestration of its participants' communications. The term "participant," as used herein, refers to any entity (e.g., hardware device driver, software module, etc.) configured to register with platform framework 200 by issuing a registration command to management and oversight engine 202 via API 205. Upon registration, each participant may receive a handle usable by services 215A-N within management and oversight engine 202 (and other participants) to address it. In some cases, the handle may be validated by Root-of-Trust (RoT) hardware (e.g., EC 120) as part of the participant registration process.

In various embodiments, platform framework 200 may include at least three different types of participants: producers, consumers, and providers.

Producers are entities (e.g., 207A-N) configured to advertise or publish the capabilities (e.g., variables, primitives, etc.) and statuses of associated hardware (e.g., 206A) or software components (e.g., 206N) to platform framework 200 via API 205, which can then be consumed and/or modified by other participants (e.g., 210A-N). Producers (e.g., 207A-N) may also execute operations with respect to associated hardware components (e.g., 206A-N) based upon instructions (e.g., "set" commands) received from other participants (e.g., 210A-N) via API 205.

On the producer side, resources 206A-N may include, for example, hardware 206A, BIOS 206B, OS 206C, application 206D (a producer role for consumer application 210N), and application 206N (a producer-only application). Each of resources 206A-N may have a producer driver or module 207A-N (a "producer") associated therewith, and each such producer 207A-N may have corresponding orchestrator logic 208A-N that enables its registration and subsequent communications with platform framework 200 via API 205. Once registered, producers 207A-N may provide information to platform framework 200 on their own, upon request by management and oversight engine 202, and/or upon request by any consumer (e.g., 210A-N).

Consumers are entities (e.g., 210A-N) that retrieve data (e.g., a single data item, a collection of data items, data subscribed to from selected producers, etc.) from platform framework 200 using API 205 to then perform one or more actions.

On the consumer side, each of consuming applications 210A-N (a "consumer") may have a corresponding orchestrator logic 211A-N that also enables registration and subsequent communications with platform framework 200 using API 205. For example, applications 210A-N may use API 205 commands request data via platform framework 200 from any registered producer 207A-N or provider 209A-N. In the case of application 212 that is not natively aware of, or compliant with, platform framework 200 (e.g., the application uses direct-to-driver access), interface application or plugin 213 and orchestrator logic 214 may enable its inter-operation with platform framework 200 via API 205.

In various embodiments, orchestrator logic 208A-N, 211A-N, and 214 are each a set of APIs to manage a respective entity, such as applications 211A-N, participants 207A-N, and PF interface 213. Particularly, each entity may use its orchestrator interface to register themselves against platform framework 200, with a list of methods exposed within the orchestrator logic's APIs to query for capabilities, events to listen/respond on, and other orchestration operations tied to routing and efficiency.

In some cases, a single application may operate both as a consumer and a producer with respect to platform framework 200. For example, application 210N may operate as a consumer to receive BIOS data from BIOS 206B via API 205. In response to receiving data from producer 207B associated with BIOS 206B, application 210N may execute one of more rules to change the IHS 100's thermal settings. As such, the same application 210N may also operate as producer 206D, for example, by registering and/or advertising its thermal settings to platform framework 200 for consumption by other participants (e.g., 210A) via API 205.

Providers 209A-N are runtime objects that collect data from multiple participants and make intelligent modifications to that data for delivery to other participants (e.g., consumers) through platform framework 200. Despite a provider (e.g., 209A) being an entity within management and oversight engine 202, it may be registered and/or advertised with platform framework 200 as if it were one of producers 207A-N.

As an example, a status provider (e.g., 209A) may collect hardware information from hardware resource(s) 206A and BIOS information (e.g., from BIOS 206B), make a status determination for IHS 100 based upon that data, and deliver the status to platform framework 200 as if it were a hardware component or driver. As another example, a status provider (e.g., 209A) may receive user presence information from sensor hub 114 (e.g., hardware 206A), receive human interface device (HID) readings from OS 209C, make its user own presence determination based upon some concatenation of those two inputs, and publish its user presence determination to platform framework 200 such that other participants do not have to make redundant findings.

API 205 may include a set of commands commonly required of every participant (consumers and producers) of platform framework 200, for example, to perform get or set operations or methods. Predominantly, producers 207A-N may use API 205 to register, advertise, and provide data to consumers (e.g., 210A-N), whereas consumers 210A-N may use API 205 to receive that data and to send commands to producers 207A-N.

Moreover, applications 210A-N may discover all other participants (e.g., hardware 206A and enumerated/supported capabilities, etc.) that are registered into platform framework 200 using API 205. For example, if hardware 206A includes graphics subsystem 107, application 210A may use API 205 to obtain the firmware version, frame rate, operating temperature, integrated or external display, etc. that hardware 206A provides to platform framework 200, also via API 205.

Applications 210A-N may use information provided by platform framework 200 entirely outside of it, and/or they may make one or more determinations and configure another participant of platform framework 200. For example, application 210A may retrieve temperature information provided by hardware 206A (e.g., GPU 107), it may determine that an operating temperature is too high (i.e., above a selected threshold), and, in response, it may send a notification to BIOS 206B via producer 207B to configure the IHS's thermal settings according to a thermal policy. It should be noted that, in this example, by using API 205, application 210A does not need to have any information or knowledge about how to communicate directly with specific hardware 206A and/or BIOS component 206B.

In various implementations, API 205 may be extendable. Once a participant subscribes to, or registers with, platform framework 200 via API 205, in addition to standard commands provided by API 205 itself (e.g., get, set, discovery, notify, multicast, etc.), the registered participant may also advertise the availability of additional commands or services.

For instance, express sign-in and/or session management application 210A, thermal policy management application 210B, and privacy application 210C may each need to obtain information from one or more user presence/proximity sensors (e.g., sensors 112) participating in platform framework 200 as hardware providers 206A. In this case, the extensibility of API 205 may allow for the abstraction and arbitration of two or more sensors 112 at the platform framework 200 layer; instead of having every application 210A-C reach directly into sensors 112 and potentially crash those devices and/or driver stacks (e.g., due to contention).

As another example, raw thermal and/or power information may be provided into platform framework 200 by one or more sensors 112 as hardware producers 207A and consumed by two or more applications, such as thermal management application 210A and battery management application 210B, each of which may subscribe to that information, make one or more calculations or determinations, and send responsive commands to BIOS 206C using API 205 in the absence of any specific tools for communicate directly with hardware 206A or BIOS 206B.

As yet another example, provider 209A may communicate with an application 211A, such as a battery management application or OS service, and it may set application or OS service 211A to a particular configuration (e.g., a battery performance "slider bar") using API 205 without specific knowledge of how to communicate directly with that application or OS service, and/or without knowing what the application or OS service is; thus platform framework 200 effectively renders provider 209A application and/or OS agnostic.

Within core framework backbone 201, management and oversight engine 202 includes services 215A-N within platform framework 200 that may be leveraged for the operation of all participants. Examples of services 215A-N include, but are not limited to: registration (e.g., configured to enable a participant to register and/or advertise data with platform framework 200), notification (e.g., configured to notify any registered participant of a status change or incoming data), communication/translation between user and kernel modes (e.g., configured to allow code executing in kernel mode to traverse into user mode and vice-versa), storage (e.g., configured to enable any registered participant to store data in session storage database 204), data aggregation (e.g., configured to enable combinations of various status changes or data from the same or multiple participants), telemetry (e.g., configured to enable collection and storage of data usable for monitoring and debugging), arbitration (e.g., configured to enable selection of one among two or more data sources or requests based upon an arbitration policy), manageability (e.g., configured to manage services 215A-N and/or databases 203/204 of platform framework 200), API engine (e.g., configured to extend or restrict available commands), etc.

Framework telemetry database 203 may include, for example, an identification of participants that are registered, data produced by those participants, communication metrics, error metrics, etc. that may be used for tracking and debugging platform framework 200. Session storage database 204 may include local storage for sessions established and conducted between different participants (e.g., data storage, queues, memory allocation parameters, etc.).

In some implementations, a containerized workspace and/or an application executed therewithin may participate as a producer (e.g., 207A-N/206A-N) or as a consumer (e.g., 210A-N) of platform framework 200. Particularly, IHS 100 may be employed to instantiate, manage, and/or terminate a secure workspace that may provide the user of IHS 100 with access to protected data in an isolated software environment in which the protected data is segregated from: the OS of IHS 100, other applications executed by IHS 100, other workspaces operating on IHS 100 and, to a certain extent, the hardware of IHS 100. In some embodiments, the construction of a workspace for a particular purpose and for use in a particular context may be orchestrated remotely from the IHS 100 by a workspace orchestration service. In some embodiments, portions of the workspace orchestration may be performed locally on IHS 100.

In some embodiments, EC 120 or a remote access controller (RAC) coupled to processor(s) 101 may perform various operations in support of the delivery and deployment of workspaces to IHS 100. In certain embodiments, EC 120 may interoperate with a remote orchestration service via the described out-of-band communications pathways that are isolated from the OS that runs on IHS 100. In some embodiments, a network adapter that is distinct from the network controller utilized by the OS of IHS 100 may support out-of-band communications between EC 120 and a remote orchestration service. Via this out-of-band signaling pathway, EC 120 may receive authorization information that may be used for secure delivery and deployment of a workspace to IHS 100 and to support secure communication channels between deployed workspaces and various capabilities supported by IHS 100, while still maintaining isolation of the workspaces from the hardware and OS of IHS 100.

In some embodiments, authorization and cryptographic information received by EC 120 from a workspace orchestration service may be stored to a secured memory. In some embodiments, EC 120 may access such secured memory via an I²C sideband signaling pathway. EC 120 may support execution of a trusted operating environment that supports secure operations that are used to deploy a workspace on IHS 100. In certain embodiments, EC 120 may calculate signatures that uniquely identify various hardware and software components of IHS 100. For instance, remote EC 120 may calculate hash values based on instructions and other information used to configure and operate hardware and/or software components of IHS 100.

For instance, EC 120 may calculate a hash value based on firmware and on other instructions or settings of a component of a hardware component. In some embodiments, hash values may be calculated in this manner as part of a trusted manufacturing process of IHS 100 and may be stored in the secure storage as reference signatures used to validate the integrity of these components later. In certain embodiments, a remote orchestration service supporting the deployment of workspaces to IHS 100 may verify the integrity of EC 120 in a similar manner, by calculating a signature of EC 120 and comparing it to a reference signature calculated during a trusted process for manufacture of IHS 100.

EC 120 may execute a local management agent configured to receive a workspace definition from the workspace orchestration service and instantiate a corresponding workspace. In this disclosure, "workspace definition" generally refers to a collection of attributes that describe aspects a workspace that is assembled, initialized, deployed and operated in a manner that satisfies a security target (e.g., the definition presents an attack surface that presents an acceptable level of risk) and a productivity target (e.g., the definition provides a requisite level of access to data and applications with an upper limit on latency of the workspace) in light of a security context (e.g., location, patch level, threat information, network connectivity, etc.) and a productivity context (e.g., performance characteristics of the IHS 100, network speed, workspace responsiveness and latency) in which the workspace is to be deployed. A workspace definition may enable fluidity of migration of an instantiated workspace, since the definition supports the ability for a workspace to be assembled on any IHS 100 configured for operation with the workspace orchestration service.

In specifying capabilities and constraints of a workspace, a workspace definition (e.g., in the form of an XML file, etc.) may prescribe one or more of: authentication requirements for a user, types of containment and/or isolation of the workspace (e.g., local application, sandbox, docker container, progressive web application (PWA), Virtual Desktop Infrastructure (VDI)), applications that can be executed in the defined containment of the workspace with access to one or more data sources, security components that reduce the scope of the security target presented by the productivity environment (e.g., DELL DATA GUARDIAN from DELL TECHNOLOGIES INC., anti-virus software), the data sources to be accessed and requirements for routing that data to and from the workspace containment (e.g., use of VPN, minimum encryption strength), workspace capabilities available to independently attach other resources, whether or not the workspace supports operability across distinct, distributed instances of platform framework 200 (e.g., by including or excluding an identity of another platform framework, or an identity of another workspace with access to a platform framework).

In some implementations, workspace definitions may be based at least in part on static policies or rules defined, for example, by an enterprise's Information Technology (IT) personnel. In some implementations, static rules may be combined and improved upon by machine learning (ML) and/or artificial intelligence (AI) algorithms that evaluate historical productivity and security data collected as workspaces are life cycled. In this manner, rules may be dynamically modified over time to generate improved workspace definitions. If it is determined, for instance, that a user dynamically adds a text editor every time he uses MICROSOFT VISUAL STUDIO from MICROSOFT CORPORATION, then the workspace orchestration service may autonomously add that application to the default workspace definition for that user.

During operation, as an instantiated workspace is manipulated by a user, new productivity and security context information related to the behavior or use of data may be collected by the local management agent, thus resulting in a change to the productivity or security context of the workspace. To the extent the user's behavioral analytics, device telemetry, and/or the environment has changed by a selected degree, these changes in context may serve as additional input for a reevaluation, and the result may trigger the remote orchestration service to produce a new workspace definition (e.g., adding or removing access to the workspace as a consumer or producer to an external or distributed platform framework), extinguish the current workspace, and/or migrate contents of the current workspace to a new workspace instantiated based on the new workspace definition.

In some cases, platform framework 200 may be extensible or distributed. For example, different instances or portions of platform framework 200 may be executed by different processing components (e.g., processor(s) 101 and EC 120) of IHS 100, or across different IHSs. Additionally, or alternatively, independent instances of platform framework 200 may be executed by different workspaces and in secure communications with each other, such that a participant, service, or runtime object's handle may identify the particular platform framework 200 that the participant or service is registered with. Services between these different instances of platform frameworks may communicate with each other via an Interprocess Communication (IPC) resource specified in a handle provided by the workspace orchestration service for communications with the workspace(s) involved.

In some embodiments, a workspace definition may specify the platform framework namespaces that a workspace will rely upon. Producers and providers may be associated with namespaces that are supported by a platform framework. For example, producers associated with each of the cameras that are available may be registered within a camera namespace that is supported by platform framework 200. In the same manner, producers and providers that provide user presence detection capabilities may be registered within a user presence detection namespace that is supported by platform framework 200. Other examples of namespaces may include, but are not limited to: a location namespace, a posture namespace, a network namespace, an SoC namespace, etc.

For instance, a workspace definition may specify registration of a workspace in a user presence detection namespace of the IHS, where user presence information may be utilized by the workspace in enforcing security protocols also set forth in the workspace definition, such as obfuscating the graphical interfaces of the workspace upon detecting a lack of a particular user in proximity to the IHS, thus preserving the confidentiality of sensitive data provided via the workspace.

In some cases, the workspace definition of a workspace may specify that the workspace: instantiate its own a platform framework, use a platform framework instantiated within another workspace (in the same or different IHS), and/or use a combination of different instances of platform frameworks (one or more of which may be instantiated by another workspace). Moreover, the platform framework option as prescribed by a workspace definition may be based upon the resolution of any of the aforementioned contextual rules (e.g., based on IHS posture, location, user presence, etc.).

As used herein, the term "runtime object" refers to a piece of code (e.g., a set of program instructions) or information that can be instantiated and/or executed in runtime without the need for explicit compilation. For example, in the context of an arbitration operation, the code that executes the arbitration may already be compiled, whereas the polic(ies) that the code enforces may change at runtime (e.g., by a user's command in real time) and therefore may be considered "runtime objects."

In various embodiments, systems and methods described herein may enable applications and services to run locally upon a common feature set by configuring platform framework 200 to provision, utilize, and/or manage credentials locally on an IHS in a scalable and secured manner. These applications and services may be scaled and modernized to interact with credentials without the need for intimate knowledge of implementation details (e.g., secure storage, encryption methodology, storage location, etc.).

For example, using systems and methods described herein, an application or service (e.g., 210A-N) may interact with platform framework 200 to provision credentials for application-to-application communication, extract user credentials from platform hardware for authorization requests, communicate credential technologies local to IHS 100 and required interfaces to extract and extend, and/or configure application-defined authorization rules into platform storage mechanisms. Moreover, allowing these applications and services to communicate through API 205 without having to know the detailed methods of underlying implementation also enables scalable performance optimizations.

In the absence of the systems and methods described herein, every containerized application would have to develop and generate its own user authentication ecosystem, which would require a user to authenticate each individual application in each workspace that is opened for advanced authorization operations. Moreover, in a conventional system, credentials generated on client for local distribution would be typically stored by the OS in software-encrypted repositories and updated with irregular cadences, thus creating significant security vulnerability concerns of replay and extraction.

For example, consider a situation where an application wants to get a user's authentication credentials from IHS 100 (i.e., a password, biometric information, an authentication certificate, or cryptographic material provided by the user). In contrast with conventional techniques, systems and methods described herein do not require that the application have detailed knowledge of existing authentication or credential/token extraction methods. Moreover, using the systems and methods described herein, the addition of a new hardware component or token does not require the application to have knowledge of the new authentication method (e.g., key included in CLSC card, etc.), and the application does not need a customized user interface (UI) feature for user extraction.

Consider another situation where an application seeks system-level security in a secured manner (e.g., the application only installs and executes on a particular type of IHS 100 system with a particular application or hardware component installed installed). In contrast with conventional techniques, systems and methods described here do not require that the application have detailed system knowledge, for example, of the interface with EC 120 (or Dell™, ControlVault™, etc.) for secure credential storage and provisioning. In addition, platform framework 200 may communicate implementation details of communication and verification to the application for build time implementation.

Consider yet another situation where a module provisions credentials required for authentication into a resource application and ties them to a user's credentials (e.g., the resource application requires calling applications to utilize a certificate provisioned during launch). Again, in contrast with conventional techniques, systems and methods described herein do not require that the module have detailed knowledge of credential storage, or that the module push the credentials to calling applications put on an authorization list; nor that any calling applications obtain the credential and have knowledge of the secure storage method and authorization manner.

In some embodiments, an application (e.g., 210A-N) may want get user authentication material. Different authentication replay technologies (e.g., Kerberos, Hello, FIDO, etc.) may require significant hardware knowledge of the system. Using the systems and methods described herein, however, these applications may obtain these credentials (e.g., evaluated token, active credential or otherwise) from the user based on implementation state and/or context information and/or upon an authentication policy provided in a workspace definition, thus reducing traditional customization development activities for extracting OS replay credentials. Additionally, or alternatively, systems and methods described herein may reduce or eliminate additional authentication challenge activities and leverage previous successful authentication actions.

For example, an application developer may want to leverage replay credential(s) obtained from the OS from a user's login. Conventionally, the developer would have to perform custom commands for each OS and obtain information specific for each (e.g., a "Hello" credential in WINDOWS and an "OATH2" credential in CHROME, etc.). In various embodiments described herein, however, a single repository may obtain all credentials for replay operations.

As another example, a user may authenticate themselves to one application (a "resource application") on the framework to gain access to an associated resource. Subsequently, the user may access a second application (a "calling application") that also requires user authentication. In various embodiments, the calling application may use the same authentication mechanism without needing to be configured to use the resource application's authentication method.

Figure 3:
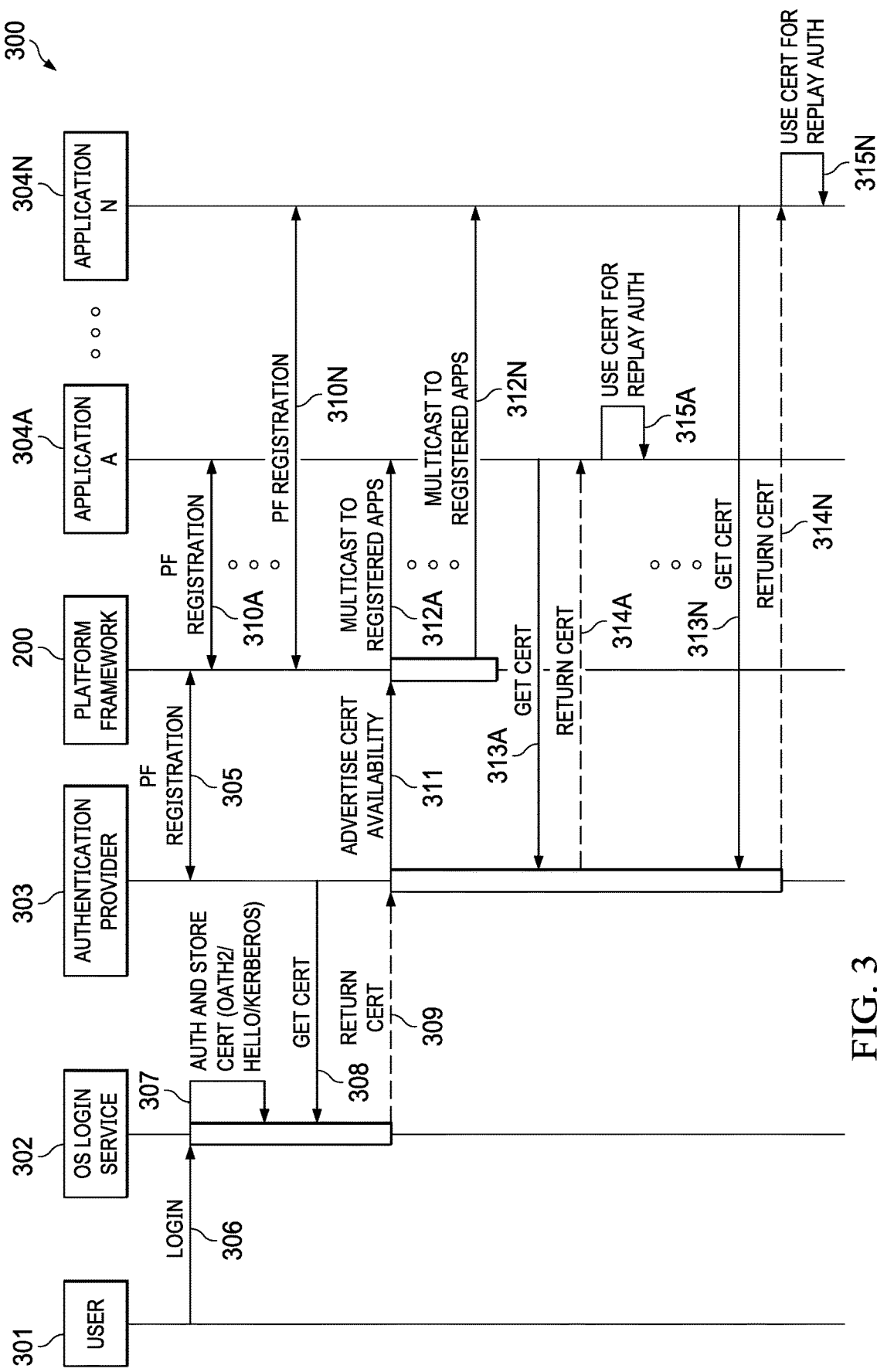
FIG. 3 is a message diagram illustrating an example of a method for runtime management of user credentials in a platform framework, according to some embodiments.

FIG. 3 is a message diagram illustrating an example of method 300 for runtime management of user credentials in platform framework 200, according to some embodiments. Particularly, in operation 305, authentication provider 303 (e.g., 209A-N) registers platform framework 200. In operation 306, user 301 logs into OS login service 302 (e.g., 206C). For example, the user may provide a password, biometric identification, or other authentication material to OS login service 302. Then, in operation 307, OS login service 302 authenticates user 301 via a selected authentication method (e.g., Kerberos, OATH2, Hello, etc.) and stores an authentication credential (e.g., a certificate, etc.) in a credential repository (e.g., in session storage database 204) and/or EC 120 (e.g., 206A).

In operation 308, authentication provider 303 (e.g., 209A-N) requests stored authentication credentials from OS login service 302. In operation 309, OS login service 302 returns the credentials to authentication provider 303.

In operations 310A-N, each of applications 304A-N registers with a registration service (e.g., 215A-N) of platform framework 200 via API 205. In operation 311, authentication provider 303 advertises the availability of the authentication credential and/or and indication of the method of authentication to registered applications 304A-N via API 205. For example, authentication provider 303 may use a notification service (e.g., 215A-N) of platform network 200 to multicast messages to applications 304A-N in operations 312A-N.

In some cases, authentication provider 303 may execute an authentication policy that includes rules allowing or forbidding the advertisement of credentials to selected ones of applications 304A-N based upon context information (e.g., any combination of location of the IHS, user's proximity to the IHS, IHS posture, power state of the IHS, battery charge level of the IHS, etc.). For example, a policy rule may establish that certain applications or types of applications (e.g., web browsers, web apps, etc.) should or should not receive and/or be aware of otherwise available authentication credential depending upon context (e.g., in an unsecure geographic location, when connected a public access point, etc.). Moreover, in the case of containerized environments, such authentication policies and/or rules may be identified in a workspace definition or received from a remote orchestration service and may change dynamically according to changes in productivity, risk, and/or security metrics.

In operations 313A-N, each of applications 304A-N requests the advertised authentication credential(s), as well as an indication of a type of authentication method(s) (e.g., Hello-Auth, FIDO-Auth, OATH-Auth, etc.) from authentication provider 303 via API 205. In operations 314A-N, each of applications 304A-N receives the advertised authentication credential(s). Then, in operations 315A-N, each of applications 304A-N replays the authentication method(s) using the received credential(s). In some cases, if a replay authentication fails, the requesting application may notify authentication provider 303 to assert reauthentication, etc.

As such, systems and methods described herein may advertise and distribute user credentials between applications on a common framework to optimize development and/or to reduce user re-authentication requirements.

In addition to handling user credentials, consider now a situation where two or more applications would like to talk to one another securely. Traditionally, these applications would need to be aware of each components' authorization needs and capabilities to negotiate and obtain authorization for communications and/or to use a resource. Using systems and methods described herein, however, these applications may instead communicate with a third-party authentication application configured to provide common interfaces for authentication collection and to communicate with connected third parties via platform framework 200. Particularly, an authentication application may collect authentication credential material from a resource application and provide service tokens to calling applications for communication with the resource application without the need for direct and/or specific knowledge of the authorization requirements of the resource application.

Figure 4:
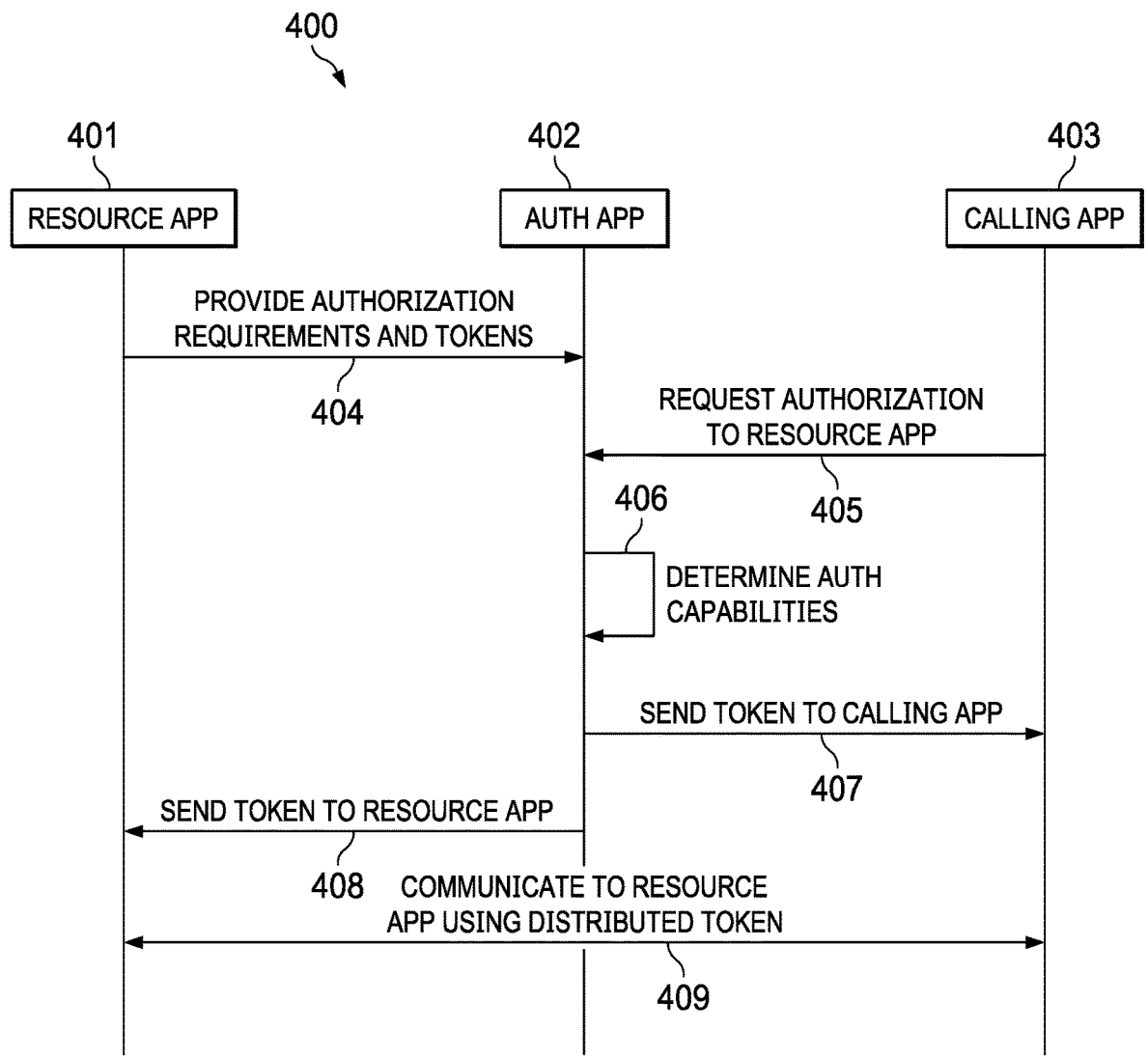
FIG. 4 is a message diagram illustrating an example of a method for application authentication in a platform framework, according to some embodiments.

FIG. 4 is a message diagram illustrating an example of method 400 for application authentication in platform framework 200, according to some embodiments. In method 400, authentication application 402 (e.g., 206N, authentication provider 303, etc.) may provide interface(s) for any framework application (e.g., 210A-N) to store credentials and authorization requirements for calling application(s) 403 (e.g., 210A-N) to utilize.

In operation 404, resource application 401 may provide, to authentication application 402, an indication of authorization requirements and some credential material (e.g., a token) for calling application 403 to utilize to communicate directly with resource application 401 and/or outside or independently of platform network 200. In operation 405, calling application 403 communicates with authentication application 402 requesting credentials to access a resource provided by resource application 401.

In operation 406, authentication application 402 determines whether the authentication capabilities of calling application 403 match the requirements of resource application 401 based upon the resource application's registration information. In some cases, authentication application 402 may also execute an authentication policy that includes rules allowing or forbidding direct access of resource application 401 by selected ones of calling application(s) 403 based upon context information (e.g., any combination of location of the IHS, user's proximity to the IHS, IHS posture, power state of the IHS, battery charge level of the IHS, etc.).

For example, a policy rule may establish that certain applications or types of calling applications (e.g., web browsers, web apps, etc.) should or should not receive tokens to communicate directly with resource application 401 depending upon context (e.g., in an unsecure geographic location, when connected a public access point, etc.). Moreover, in the case of containerized environments, such authentication policies and/or rules may be identified in a workspace definition or received from a remote orchestration service, and may change dynamically according to changes in productivity, risk, and/or security metrics.

As a result of operation 406, if authentication application 402 determines that the authentication capabilities of calling application 403 match the requirements of resource application 401 and/or if the authentication policy allows, in operations 407 and 408 authentication application 402 sends token(s) to calling application 403 and to resource application 401 in operations 407 and 408, respectively. Then, in operation 409, calling application 403 and to resource application 401 communicate directly with each other using the distributed tokens.

In some cases, authorization may be a stored credential, knowledge of platform framework 200, or a dynamically generated token. Additionally, or alternatively, authentication application 402 may provide information to resource application 401 via API 205 to ensure they are aware of pending direct resource request(s) from calling application 403. Additionally, or alternatively, authentication application 402 may provide a token received from resource application 401 at registration or dynamically at runtime, or authentication application 402 may derive token(s) in runtime without knowledge on its own and/or without sharing it with resource application 401 or calling application 303.

As such, systems and methods described herein may update and manage credentials for applications registered with platform framework 200. Calling applications need not be made aware of a resource application's authentication requirements to gain access to it. Credential delivery can be replaced without rework of the calling application, and the calling application may derive the communication credential by device capabilities, application capabilities, and/or statically.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
receive, through an authentication provider registered with a platform framework via an Application Programming Interface (API), an authentication credential;
advertise, through the authentication provider to a plurality of applications registered with the platform framework, an availability of the authentication credential, wherein the advertisement identifies a method of authentication; and
send the authentication credential to the plurality of applications.

2. The IHS of claim 1, wherein the authentication credential comprises a password, biometric information, a certificate, or cryptographic material.

3. The IHS of claim 1, wherein the authentication credential is received from an Operating System (OS) login service.

4. The IHS of claim 1, wherein the authentication credential is received from an application other than the plurality of applications.

5. The IHS of claim 4, wherein the authentication credential enables the other application to communicate with any of the plurality of applications securely and outside of the platform framework.

6. The IHS of claim 1, wherein the authentication credential is sent to at least one of the plurality of application in response to context information matching a policy.

7. The IHS of claim 6, wherein the context information comprises at least one of: a location of the IHS, a user's proximity to the IHS, an IHS posture, a power state of the IHS, or a battery charge level of the IHS.

8. The IHS of claim 6, wherein the platform framework is at least in part executed within a workspace, and wherein the policy is identified in a workspace definition associated with the workspace.

9. The IHS of claim 1, wherein the program instructions, upon execution, further cause the IHS to send the authentication credential to each given application of the plurality of applications in response to the given application's registration with the platform framework.

10. The IHS of claim 1, wherein the authentication credential is sent in response to individual requests from each of the plurality of applications.

11. A memory storage device having program instructions stored thereon that, upon execution by an Information Handling System (IHS), cause the IHS to:
receive, through an authentication provider registered with a platform framework via an Application Programming Interface (API), an authentication credential;
advertise, through the authentication provider to a plurality of applications registered with the platform framework, an availability of the authentication credential, wherein the advertisement identifies a method of authentication; and
send the authentication credential to the plurality of applications.

12. The memory storage device of claim 11, wherein the authentication credential comprises a password, biometric information, a certificate, or cryptographic material.

13. The memory storage device of claim 11, wherein the application comprises an Operating System (OS) login service.

14. The memory storage device of claim 11, wherein the authentication credential is provided to the other application by the authentication provider in response to context information matching a policy, and wherein the context information comprises at least one of: a location of the IHS, a user's proximity to the IHS, an IHS posture, a power state of the IHS, or a battery charge level of the IHS.

15. A method, comprising:
receiving, through an authentication provider registered with a platform framework via an Application Programming Interface (API), an authentication credential;
advertising, through the authentication provider to a plurality of applications registered with the platform framework, an availability of the authentication credential, wherein the advertisement identifies a method of authentication; and
sending the authentication credential to the plurality of applications.

16. The method of claim 15, wherein the authentication credential comprises a password, biometric information, a certificate, or cryptographic material.

17. The method of claim 15, wherein the application comprises an Operating System (OS) login service.

18. The method of claim 15, wherein the authentication credential is received from the authentication provider in response to context information matching a policy, and wherein the context information comprises at least one of: a location of the IHS, a user's proximity to the IHS, an IHS posture, a power state of the IHS, or a battery charge level of the IHS.

* * * * *